(12) United States Patent
Lee, IV et al.

(10) Patent No.: US 7,996,983 B2
(45) Date of Patent: Aug. 16, 2011

(54) METHOD OF MANUFACTURING A DEVICE WORN BY AN ANIMAL

(75) Inventors: Albert Leon Lee, IV, Seymour, TN (US); William S. Groh, Knoxville, TN (US); Steven L. Lawrence, Johnson City, TN (US); Steven M. Schrick, Knoxville, TN (US)

(73) Assignee: Radio Systems Corporation, Knoxville, TN (US)

( * ) Notice: Subject to any disclaimer, the term of this patent is extended or adjusted under 35 U.S.C. 154(b) by 593 days.

(21) Appl. No.: 12/107,080

(22) Filed: Apr. 22, 2008

(65) Prior Publication Data

US 2008/0196238 A1 Aug. 21, 2008

Related U.S. Application Data

(62) Division of application No. 11/386,413, filed on Mar. 22, 2006, now Pat. No. 7,382,328.

(51) Int. Cl.
*H01S 4/00* (2006.01)

(52) U.S. Cl. ............................. 29/592.1; 29/595; 29/825

(58) Field of Classification Search ................. 29/592.1, 29/595, 825
See application file for complete search history.

(56) References Cited

U.S. PATENT DOCUMENTS

| | | | |
|---|---|---|---|
| 4,426,884 A * | 1/1984 | Polchaninoff | .................. 73/172 |
| 5,182,032 A * | 1/1993 | Dickie et al. | ..................... 249/91 |
| 5,526,006 A | 6/1996 | Akahane et al. | |
| 5,886,669 A | 3/1999 | Kita | |
| 5,934,225 A | 8/1999 | Williams | |
| 6,415,742 B1 | 7/2002 | Lee et al. | |
| 6,426,464 B1 * | 7/2002 | Spellman et al. | .......... 174/101.5 |
| 6,888,502 B2 | 5/2005 | Beigel et al. | |
| 2003/0218539 A1 | 11/2003 | Hight | |

* cited by examiner

*Primary Examiner* — C. J Arbes
(74) *Attorney, Agent, or Firm* — Pitts, Lake & Bell, PC

(57) ABSTRACT

An animal training apparatus including an electrical conductor embedded within a flexible member, and a housing having a through-opening for receiving the electrical conductor therethrough. The flexible member is molded around the electrical conductor and the antenna, while the electrical conductor is positioned such that it extends into the housing through the through-opening. As a result of the molding process, the flexible member shields the housing through-opening, discouraging substances such as water from accessing the interior of the housing via the through-opening.

9 Claims, 7 Drawing Sheets

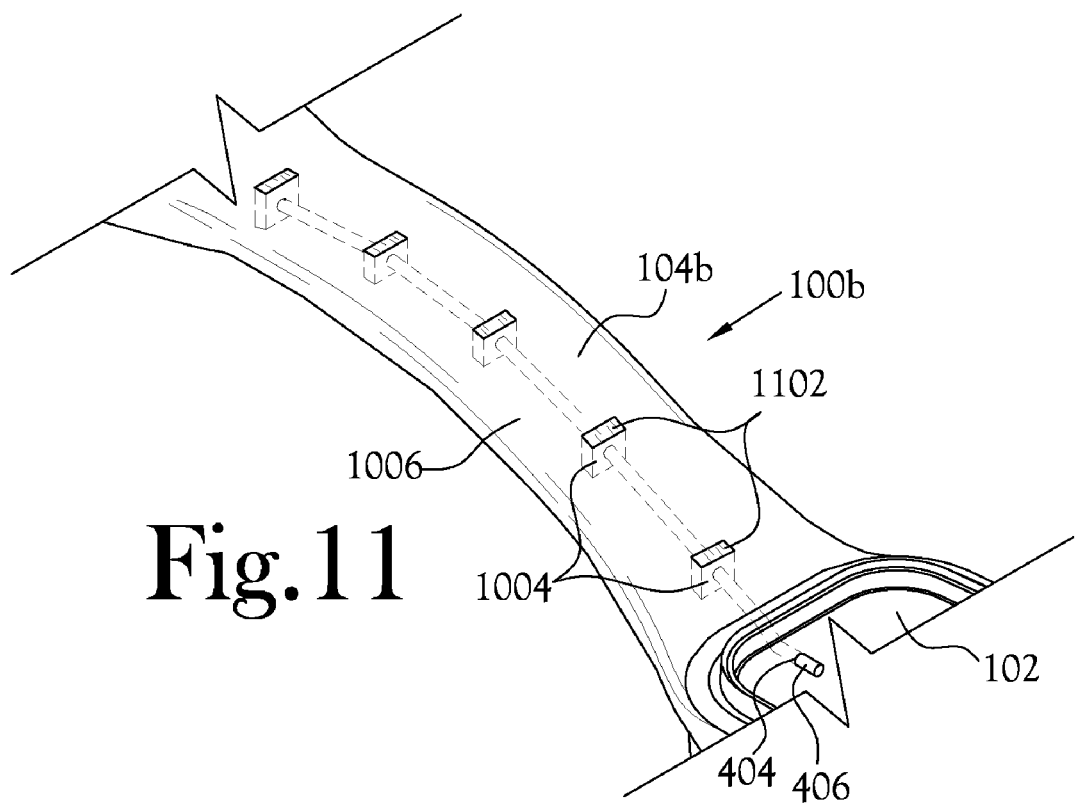
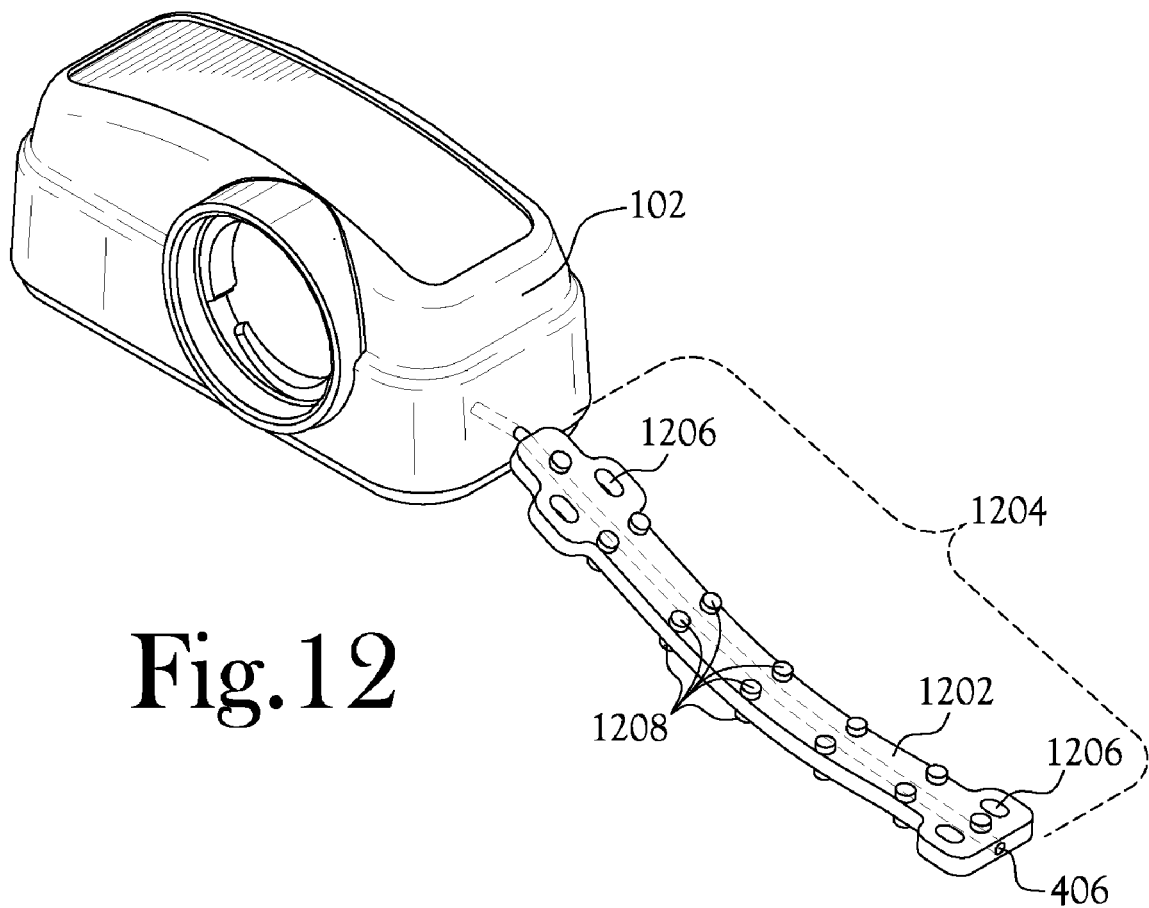

METHOD OF MANUFACTURING A DEVICE WORN BY AN ANIMAL

CROSS-REFERENCE TO RELATED APPLICATIONS

This application is a divisional of prior application Ser. No. 11/386,413, filed Mar. 22, 2006.

STATEMENT REGARDING FEDERALLY-SPONSORED RESEARCH OR DEVELOPMENT

Not Applicable

BACKGROUND OF THE INVENTION

1. Field of Invention

This invention relates to an external antenna for use with an electronic animal training device. More specifically, the invention relates to an antenna embedded within a flexible collar.

2. Description of the Related Art

There is a growing demand for animal collars that incorporate electronic components, such as transmitters, receivers, or transceivers. Generally, such an electronic component is protected by enclosing it in a housing that is integrated into the animal collar. It is well established that transmitters, receivers, and transceivers require an antenna to radiate or receive radio waves effectively. Generally, as the length of an antenna increases, the efficiency of an antenna increases. Lengthening the antenna often is the simplest way of increasing the range of a transmitter, receiver, or transceiver. A relatively long antenna, unlike a relatively short antenna, cannot be enclosed in the housing, however. Instead, such an antenna is external to the housing, and it conductively connects to the electronic component via a through-opening defined by the housing. An animal collar having an external antenna is disadvantaged in at least three respects. First, the antenna, itself, is more susceptible to damage because it protrudes from the housing and, therefore, is exposed to the elements, among other things. Second, the interface of the antenna and the housing, i.e., the through-opening, provides another avenue for water to penetrate the housing and potentially harm any electronic components therein. Finally, an external antenna can impede the movement of an animal in certain environments. For example, underbrush can easily snag an external antenna.

BRIEF SUMMARY OF THE INVENTION

An antenna enclosed within an animal training apparatus (hereinafter, "improved apparatus") and three methods for manufacturing certain of its components are provided. One embodiment of the improved apparatus includes a receiver, an antenna in conductive communication with the receiver, and a housing defining an interior and a through-opening. The interior of the housing is adapted to receive the receiver, and the through-opening is adapted to receive the antenna therethrough. This embodiment includes further a flexible member that is formed by molding material around the housing and the antenna, while the antenna is positioned such that it extends through the through-opening. As a result of the molding process, part of the flexible member is bonded to the exterior of the housing, enabling the flexible member to carry the housing. That part of the flexible member, which at least partially encapsulates the housing, also shields the housing through-opening, discouraging substances such as water from accessing the interior of the housing via the through-opening. Additionally, flash resulting from that molding process fills the remainder of the through-opening, plugging it and securing the antenna therein. The flash serves as a secondary seal that further discourages substance such as water from accessing the interior of the housing via the through-opening. Finally, as a result of molding material around the antenna as well, the flexible member encloses and protects the part of the antenna that extends beyond the housing. In this embodiment, the flexible member has the form of a collar, enabling it to releasably secure the improved apparatus to the neck of an animal.

The improved apparatus of the present invention has three major advantages over a conventional animal training apparatus. First, the improved apparatus is more durable because the antenna is enclosed in the flexible housing and, therefore, is less susceptible to damage. Second, the improved apparatus is less likely than a conventional animal training apparatus to impede the movement of an animal because the antenna is enclosed in the collar, eliminating the chance that the antenna, itself, will be snagged. Third, a seal may be formed more readily at the interface of the antenna and the housing, thereby providing greater protection from the elements.

As stated previously, three methods for manufacturing certain components of the improved apparatus are provided also. The first method requires a flexible member mold that defines prong pairs. The prong pairs are engineered to grasp the antenna upon its placement in the flexible member mold, in preparation for the molding process that forms the flexible member. Accordingly, the antenna must be placed in the flexible member mold and secured by the prong pairs. This step ensures that the antenna, during the manufacture of the flexible member, remains in proper position relative to the housing and the through-opening. The second method of manufacture uses rigid placeholders to maintain the antenna in proper position in the flexible member mold. The rigid placeholders are formed by molding material around selected parts of the antenna. Thereafter, the antenna, including the attached rigid placeholders, is transferred to the flexible member mold, where the antenna is maintained in proper position by the rigid placeholders. The third method uses a flexible placeholder to maintain the antenna in proper position in the flexible member mold. In one embodiment, the flexible placeholder, itself, is manufactured first by stretching the antenna so that it has no give or slack and suspending it in a flexible placeholder mold. Next, uncured material is injected into the flexible placeholder mold, where it surrounds the desired section of the antenna while assuming the overall form of the flexible placeholder. The material is cured, forming the flexible placeholder, which has a section of the antenna enclosed therein and which defines a plurality of alignment holes and bosses. The flexible placeholder, including the antenna, is transferred to the flexible member mold, where it is maintained in proper position using the alignment holes and bosses, in preparation for the molding process that forms the flexible member.

BRIEF DESCRIPTION OF THE SEVERAL VIEWS OF THE DRAWINGS

The above-mentioned features of the invention will become more clearly understood from the following detailed description of the invention read together with the drawings in which:

FIG. 11 is a partial view of the embodiment of the apparatus of the present invention depicted in FIG. 10, after the exposed sections of the rigid placeholders have been trimmed;

FIG. 12 is a perspective view of an embodiment of the flexible placeholder of the present invention, the housing, and the antenna.

DETAILED DESCRIPTION OF THE INVENTION

An antenna enclosed within an electronic animal training apparatus (hereinafter, "improved apparatus") is disclosed, as are various methods of manufacture.

Figure 1:
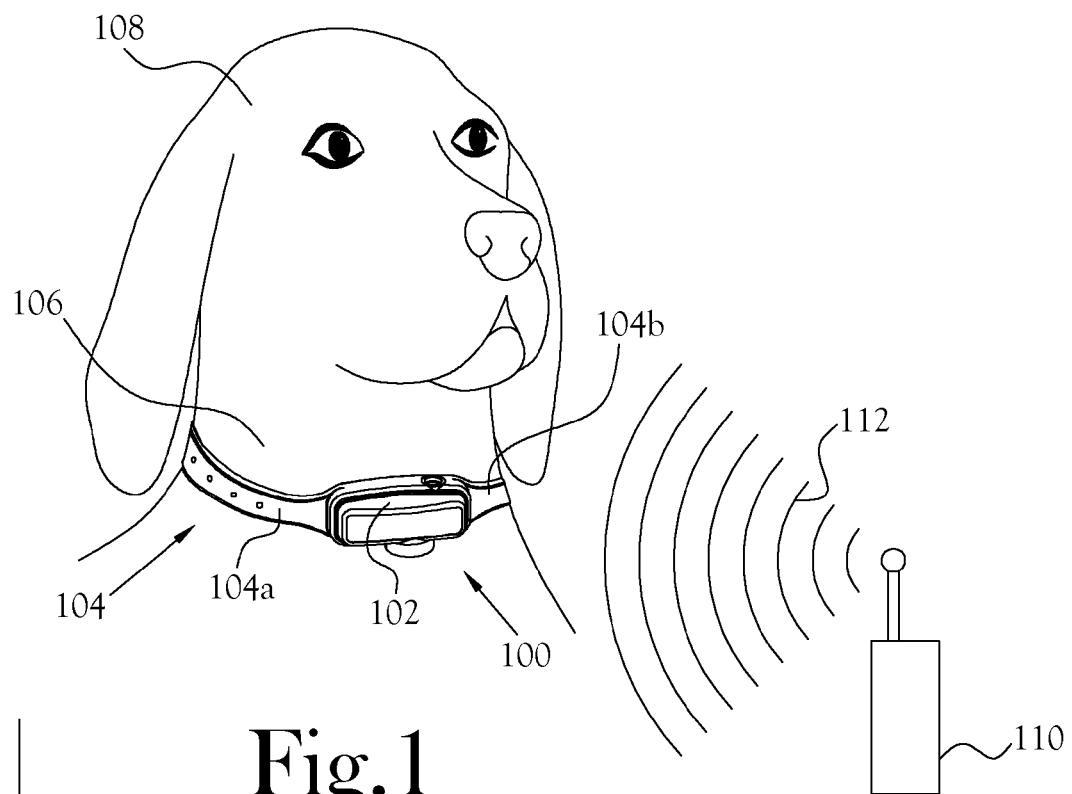
FIG. 1 depicts an animal wearing of an embodiment of the apparatus of the present invention.

FIG. 1 depicts an animal 108 wearing an embodiment of the improved apparatus 100, which includes the housing 102 and the flexible attachment member 104, having one or more flexible members 104a, 104b. The housing 102 is adapted to receive therein an electronic component (not shown) for communicating via radio waves 112 with a remote electronic device 110, such as a transmitter. The housing 102 is attached to the flexible members 104a, 104b, which, in this embodiment, forms a collar adapted to encircle a neck 106 of an animal 108 and to releasably secure the improved apparatus 100 to the animal 108. It is worth noting that the electronic component (not shown) is conductively connected to the antenna (not shown), which is not visible in this view because it is enclosed within the flexible attachment member 104. One skilled in the art will recognize that the flexible attachment member may be adapted to encircle a part of the animal 108 other than the neck 106. One skilled in the art will recognize also that any of a variety of electronic components may be enclosed in the housing 102, including a receiver, transceiver, or transmitter.

Figure 2:
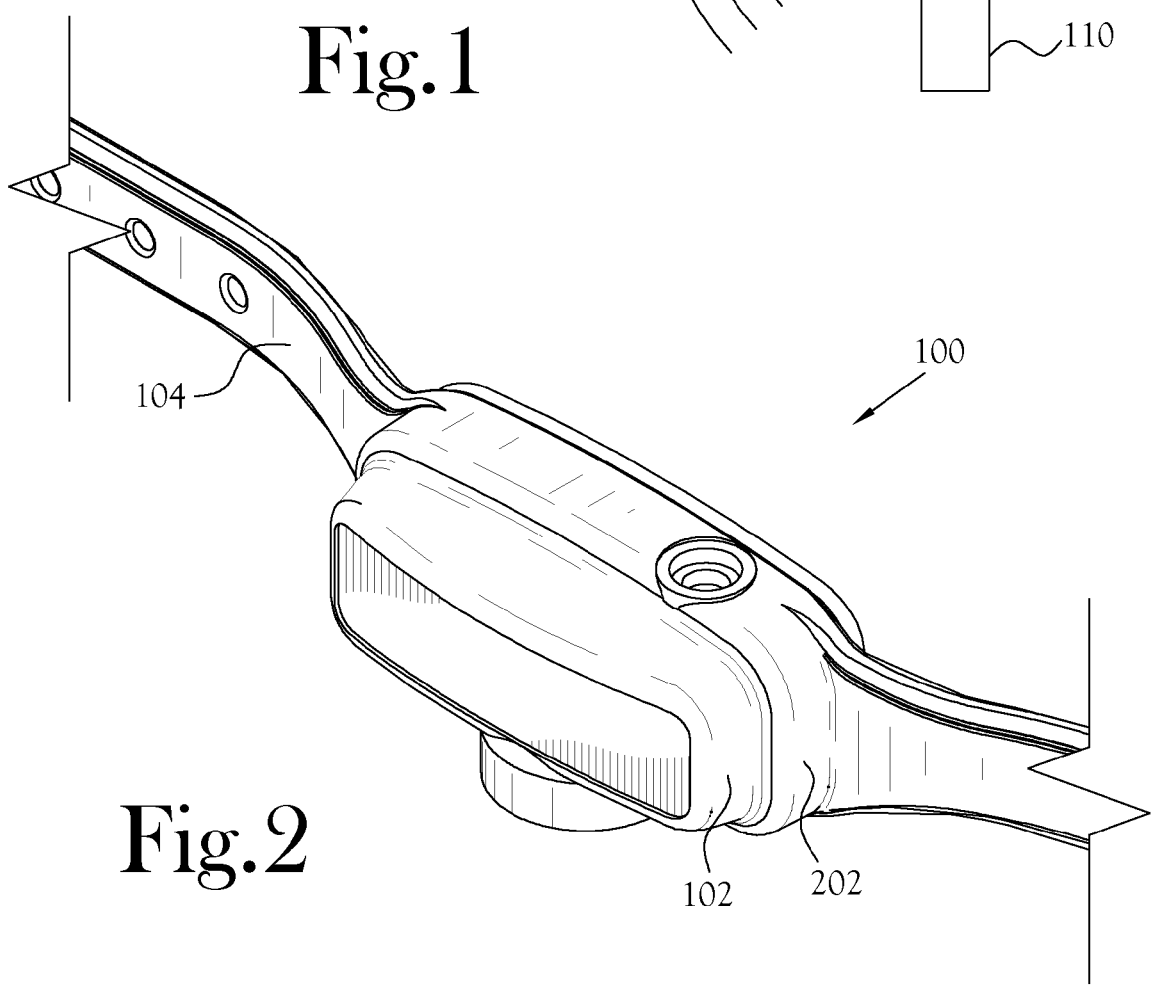
FIG. 2 is a front perspective view of the embodiment of the apparatus of the present invention depicted in FIG. 1.

FIG. 2 is a front perspective view of the embodiment of the improved apparatus 100 depicted in FIG. 1. FIG. 2 shows that the housing 102 and the flexible member 104 are attached to each other. As set forth in greater detail later in the specification, the flexible member 104 is formed by molding material (e.g., plastic or other polymeric material) around the housing 102 and the antenna (not shown). As a result, the band 202 defined by the flexible member 104 has a form that is complementary to the housing 102, thereby enabling the flexible member 104 to be attached to, and carry, the housing 102. Again, it is worth noting that the electronic component (not shown) enclosed in the housing 102 is conductively connected to the antenna (not shown), which is not visible in this view because it is enclosed within the flexible member 104. One skilled in the art will recognize that the improved apparatus may include components necessary for applying a corrective stimulus to the animal, thereby enabling the improved apparatus to be used in training/containment/access applications and in various corrections. Additionally, one skilled in the art will recognize that, in certain applications, the improved apparatus is not advantaged by including such components. For example, in an improved apparatus that is engineered merely to transmit a signal disclosing the location of the animal, such components are unnecessary.

Figure 3:
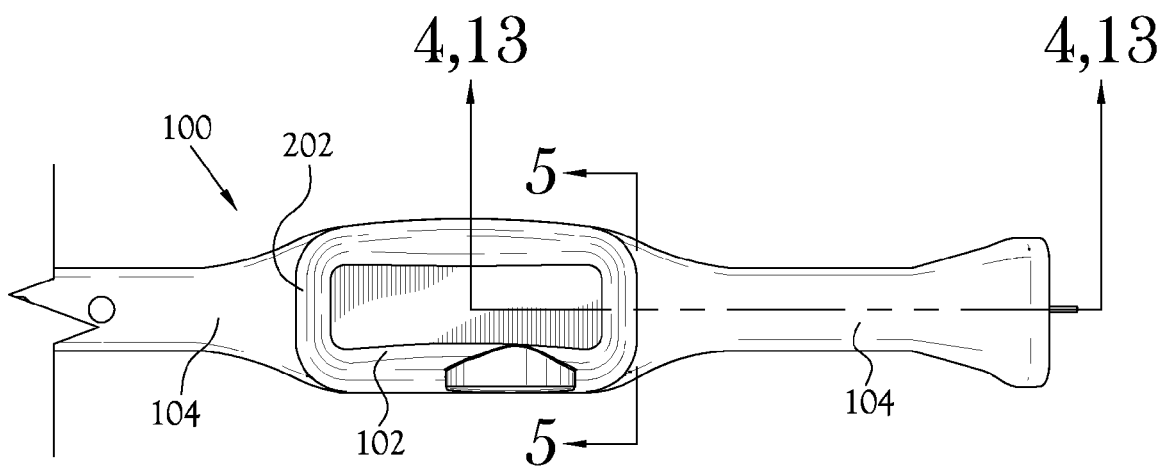
FIG. 3 is a top plan view of the embodiment of the apparatus of the present invention depicted in FIG. 1.

FIG. 3 is a top plan view of the embodiment of the improved apparatus depicted in FIGS. 1, 2. FIG. 3 serves as a reference for the partial cross-sectional views of the improved apparatus depicted in FIGS. 4, 5, and 13.

Figure 4:
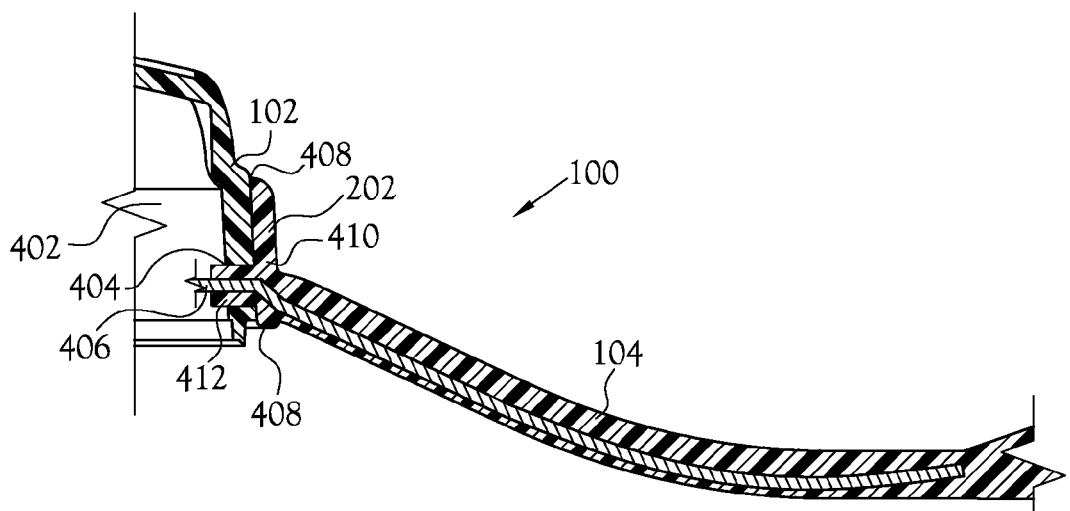
FIG. 4 is an enlarged partial cross-sectional view, taken along lines 4-4 of FIG. 3, of the apparatus of the present invention.

FIG. 4 is a partial cross-sectional view of the embodiment of the improved apparatus 100, taken along lines 44 of FIG. 3. The housing 102 is composed of a hard material, and it defines an interior 402 and a through-opening 404. The housing 102 is engineered to enclose at least one electronic component (not shown) in the interior 402, and the through-opening 404 is engineered to receive the antenna 406 therethrough so that the antenna 406 is able to conductively connect to an electronic component (not shown) enclosed in the housing 102. One skilled in the art will recognize that an electrical conductor other than an antenna may be suitable for certain applications. The flexible member 104, which in this embodiment is composed of plastic, completely encloses the antenna 406, protecting it from damage. Because the flexible member 104 is formed by molding material around the housing 102 and the antenna 406, the interface 408 between the housing 102 and the first end 410 of the flexible member 104 is sealed, preventing water or another substance from penetrating the housing 102 via the through-opening 404. Additionally, the seal aids in preventing the water or another substance from harming the antenna 406. The seal has two components: a primary seal and a secondary seal. The primary seal is effected upon formation of the band 202 of the flexible member 104. Because the band 202 is formed by molding material around the housing 102, the interior surface of the band 202 and the exterior surface of the housing 102 bond along the entire interface 408, significantly reducing the ability of water or another substance to penetrate the interface 408. The secondary seal is effected upon formation of the flexible member flash 412, a byproduct of the molding process that forms the flexible member 104. The through-opening 404 has a diameter selected to enable formation, during the molding process, of the flexible member flash 412. The flexible member flash 412 fills the through-opening 404, plugging it, thereby providing a secondary seal for protection in the event that water or another substance breaches the primary seal. One skilled in the art will recognize that the length and thickness of the flexible member flash 412 may be modified by altering the diameter of the through-opening 404.

Figure 5:
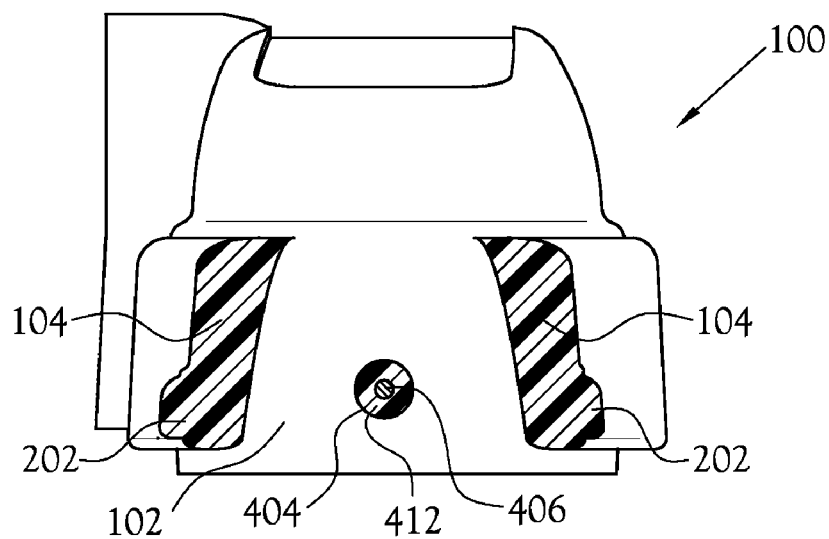
FIG. 5 is an enlarged partial cross-sectional view, taken along lines 5-5 of FIG. 3, of the apparatus of the present invention.

FIG. 5 is a partial cross-sectional view, taken along lines 5-5 of FIG. 3, of the embodiment of the improved apparatus 100 depicted in FIG. 4. FIG. 5 further discloses the configuration of the housing 102, the flexible member 104, the through-opening 404, the flexible member flash 412, and the antenna 406.

Figure 6:
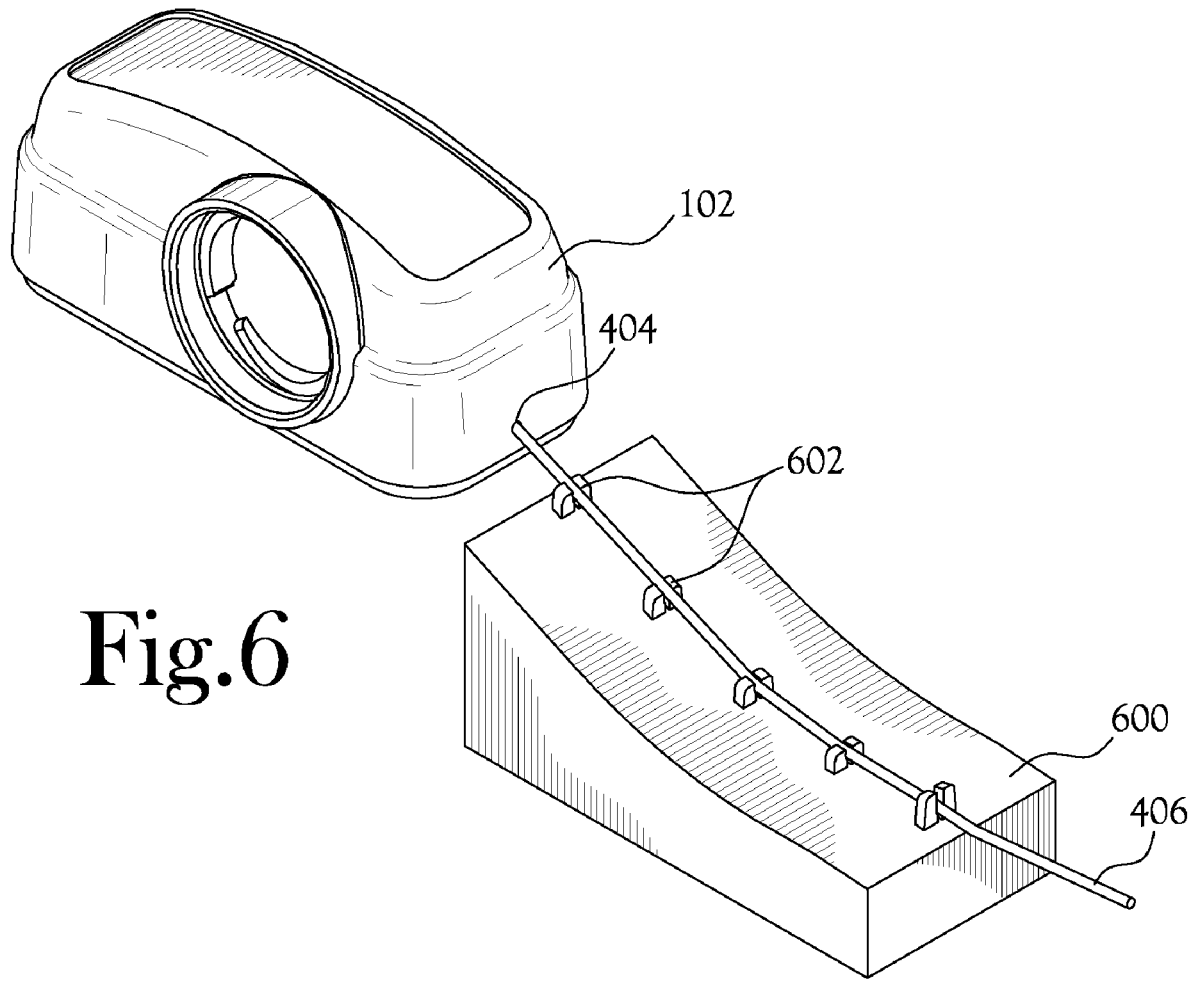
FIG. 6 is a partial perspective view of the flexible member mold that defines the prong pairs.

FIG. 6 relates to the first of the three methods presented herein for manufacturing the improved apparatus 100. The first method requires the flexible member mold 600 that defines the prong pairs 602. The prong pairs 602 are engineered to grasp the antenna 406 upon its placement in the flexible member mold 600, in preparation for the molding process that forms the flexible member 104. Accordingly, the antenna 406 is placed in the flexible member mold 600 and is secured by the prong pairs 602. Also, the housing 102 is placed in the flexible member mold 600 and is secured in position. These steps ensure that the antenna 406, during the manufacture of the flexible member 104, remains in proper position relative to the housing 102, the through-opening 404, and the flexible member mold 600. It is critical to note that the entire flexible member mold 600 is not depicted in FIG. 6. Rather, only the part defining the prong pairs 602 is depicted to emphasize their importance to this method of manufacture. After the antenna 406 is secured in position using the prong pairs 602, uncured material is forced by an injection molding apparatus into the flexible member mold 600, where it surrounds the antenna 406 and selected parts of the housing 102. Thereafter, the uncured material is cured, forming the flexible member 102, within which the antenna 406 is enclosed.

Figure 7:
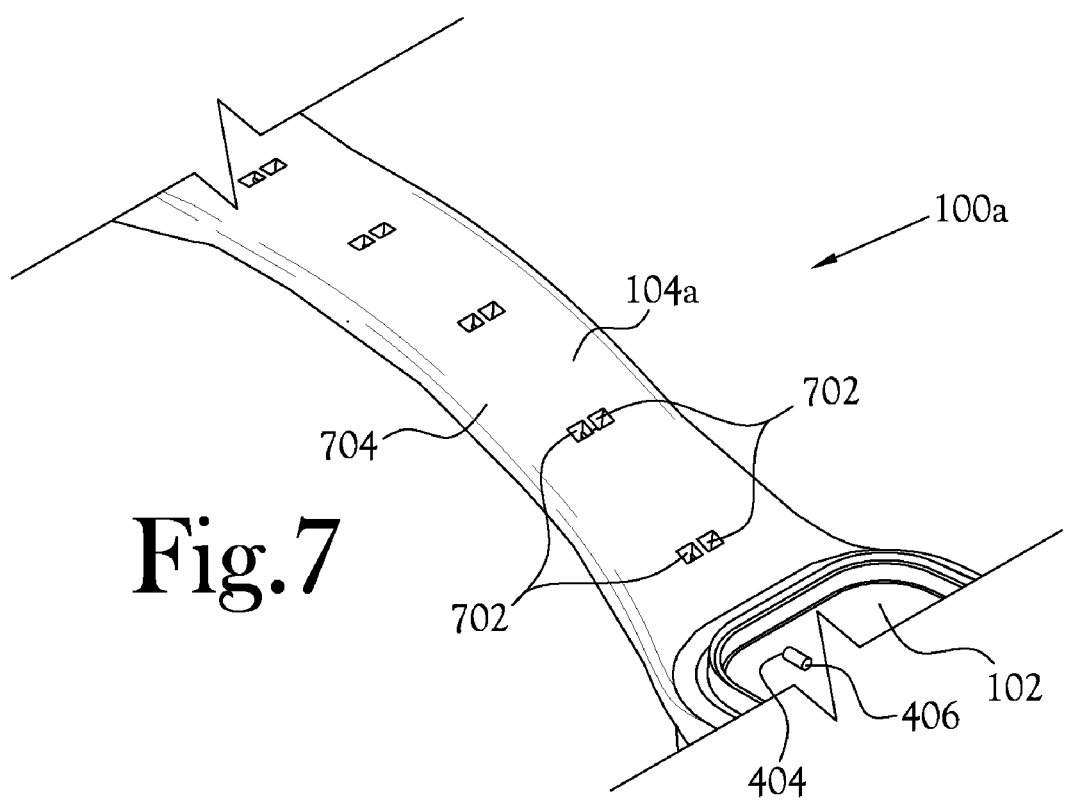
FIG. 7 is a partial view of an embodiment of the apparatus of the present invention that was manufactured using the flexible member mold that defines the prong pairs.

FIG. 7 depicts a partial view of an embodiment of the improved apparatus 100a manufactured using the first method, i.e., the method requiring the flexible member mold 600 that defines the prong pairs 602. FIG. 7 shows the flexible member 104a, the housing 102, the antenna 406, and the through-opening 404. Additionally, FIG. 7 shows the cavities 702 defined by the flexible member 104a. Each of the cavities 702 has a shape complementary to each of the prongs of the respective prong pairs 602 of the flexible member mold 600. The cavities 702 form only when the first molding method is used to manufacture the improved apparatus. Thus, FIG. 7 is useful in clarifying the relationship between the flexible member mold 600 that defines the prong pairs 602 and the resulting embodiment of the improved apparatus 100a. It is important to note that the cavities 702 in this embodiment are defined by the interior surface 704 of the flexible member 104a and not by the exterior (opposite) surface (not shown) of the flexible member. When an animal is wearing the improved apparatus, the interior surface 704 is adjacent to the surface of the animal and, consequently, is more protected than the exterior surface (not shown). This design aids in preventing water or another substance from damaging the antenna 406 by penetrating the cavities 702.

Figure 8:
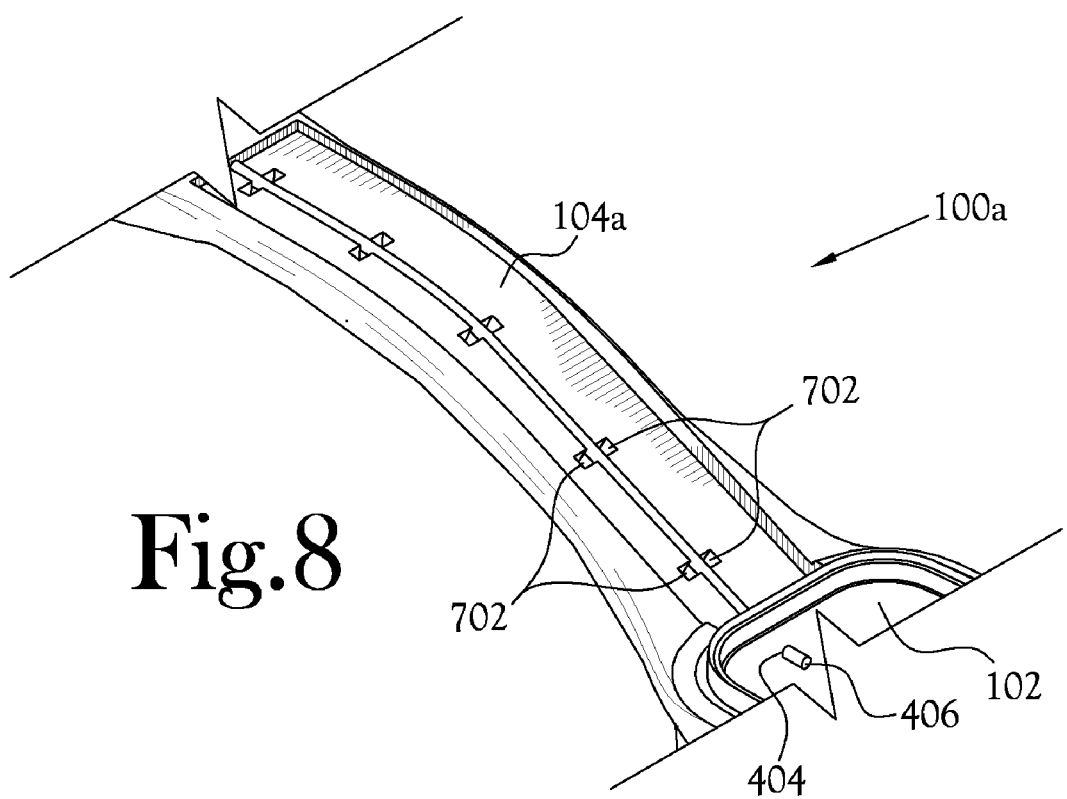
FIG. 8 is a cutaway of a partial view of the embodiment of the apparatus of the present invention depicted in FIG. 7.

FIG. 8 depicts the same partial view as in FIG. 7, except that in FIG. 8 part of the interior surface 704 has been cutaway to reveal further the configuration of the flexible member 104a, the antenna 406, and the cavities 702.

Figure 9:
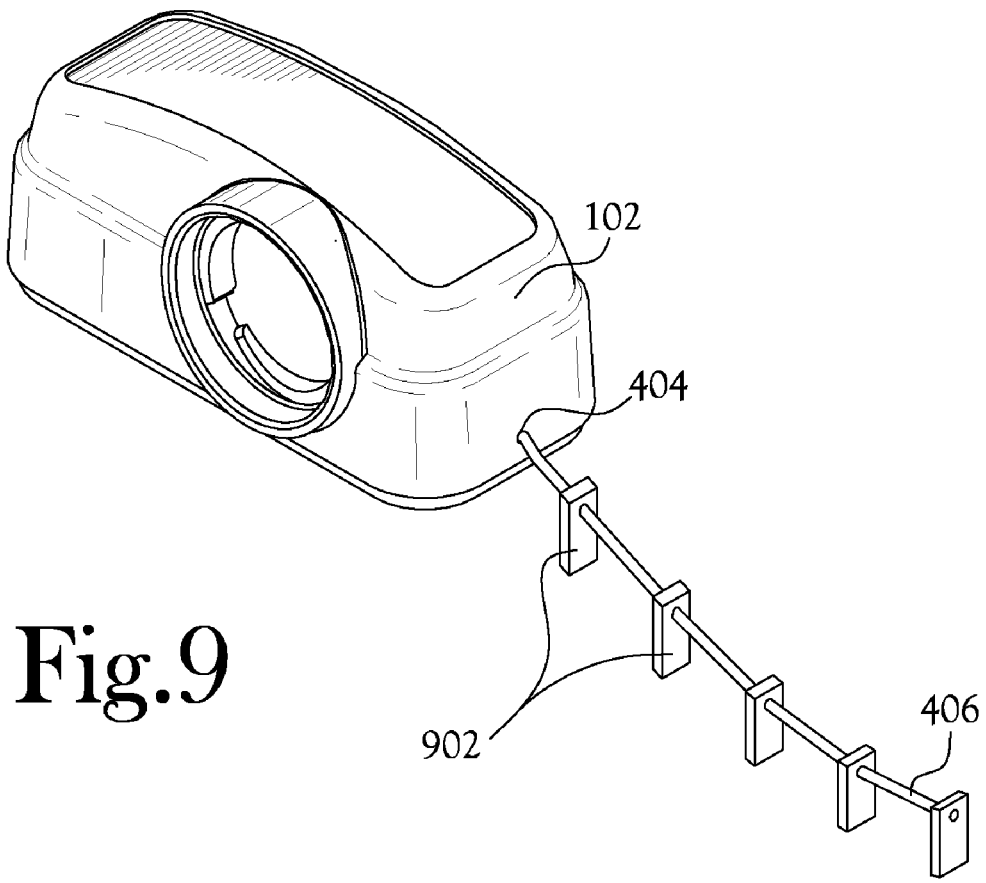
FIG. 9 is a perspective view of the rigid placeholders, the housing, and the antenna.

FIG. 9 relates to the second of the three methods presented herein for manufacturing the improved apparatus 100. The second method requires the rigid placeholders 902 depicted in FIG. 9. The rigid placeholders 902 are formed by molding material around selected parts of the antenna 406. Thereafter, the antenna 406, including the rigid placeholders 902, is placed in the flexible member mold (not shown), and the antenna 406 is maintained in position by the rigid placeholders 902, in preparation for the molding process that forms the flexible member 104. Also, the housing 102 is placed in the flexible member mold (not shown) and is secured in position. These steps ensure that the antenna 406, during the manufacture of the flexible member 104, remains in proper position relative to the housing 102 and the through-opening 404. After the antenna 406 is secured in position by the rigid placeholders 902, uncured material is forced by an injection molding apparatus into the flexible member mold (not shown), where it surrounds the antenna 406 and selected parts of the housing 102. Thereafter, the uncured material is cured, forming the flexible member 102, within which the antenna 406 is enclosed.

Figure 10:
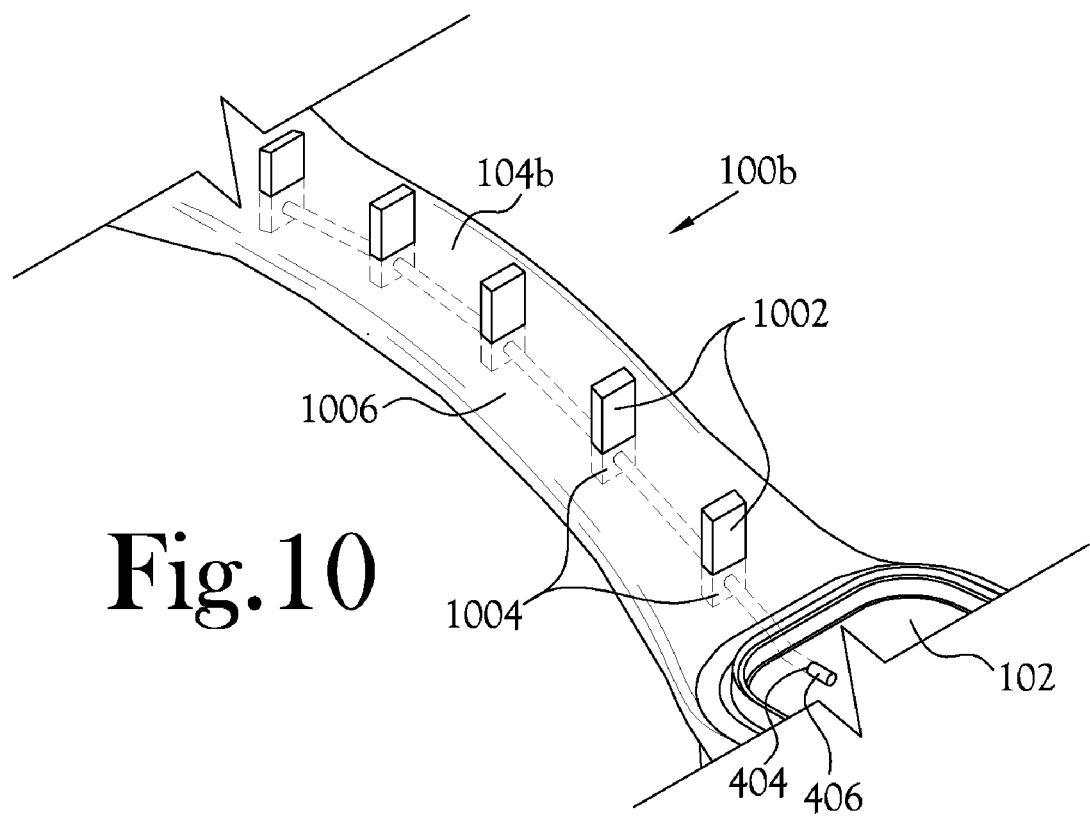
FIG. 10 is a partial view of an embodiment of the apparatus of the present invention immediately following manufacture of the flexible member, using the rigid placeholders depicted in FIG. 9.

FIG. 10 depicts a partial view of an embodiment of the improved apparatus 100b nearing completion of manufacture using the second method, i.e., the method requiring the rigid placeholders 902. Both of the molding steps already have been completed and, thus, the rigid placeholders 902 and the flexible member 104b have been formed. FIG. 10 shows the flexible member 104b, the housing 102, the antenna 406, and the through-opening 404. Additionally, FIG. 10 shows the exposed sections 1002 of the rigid placeholders 902 as well as the embedded sections 1004 of the rigid placeholders 902. The exposed sections 1002 are protruding from the interior surface 1006 of the flexible member 104b and must be trimmed.

FIG. 11 depicts the same partial view as in FIG. 10, except that in FIG. 11 the exposed sections 1002 of the rigid placeholders 902 have been trimmed and, therefore, no longer are present. The interior surface 1102 of each of the embedded sections 1004 of the rigid placeholders 902 is flush with the interior surface 1006 of the flexible member.

FIG. 12 concerns the third of the three methods presented herein for manufacturing the improved apparatus 100. The third method requires the flexible placeholder 1202. The flexible placeholder 1202 is manufactured by first securing the placeholder section 1204 of the antenna 406 in a flexible placeholder mold (not shown) such that the placeholder section 1204 assumes and maintains the desired position, such as a linear configuration. For example, one way to ensure that the placeholder section 1204 of the antenna 406 maintains a linear configuration is to stretch the antenna 406 so that it has no give or slack and suspend it in the flexible placeholder mold (not shown). After the placeholder section 1204 has assumed the desired position, linear or otherwise, uncured material (e.g., rubber or other polymeric material) is injected into the flexible placeholder mold (not shown), where it surrounds the placeholder section 1204 of the antenna 406 while assuming the overall form of the flexible placeholder 1202. Thereafter, the uncured material is cured, forming the flexible placeholder 1202, within which the placeholder section 1204 of the antenna 406 is enclosed.

The flexible placeholder 1202, as shown in the embodiment illustrated in FIG. 12, defines alignment holes 1206 to allow for securing it in proper position in the flexible member mold (not shown), in preparation for the molding process that forms the flexible member 102. The flexible placeholder 1202 defines also a plurality of bosses, such as those depicted at 1208. The bosses 1208 provide support for the flexible placeholder 1202 so that, upon its 1202 placement in the flexible member mold (not shown), there are gaps between a majority of the surface of the flexible placeholder 1202 and the interior surface of the flexible member mold (not shown). During the next molding process, which forms the flexible member 104c and is described in the following paragraph, these gaps serve as channels for the uncured material, enabling it to envelop the flexible placeholder 1202.

The next step is to place the flexible placeholder 1202, including the antenna 406, in the flexible member mold (not shown). The antenna 406 is maintained in position by the flexible placeholder 1202, which is maintained in position by the bosses 1208 and by projections (not shown), defined by the flexible member mold (not shown), that engage the alignment holes 1206. Also, the housing 102 is placed in the flexible member mold (not shown) and is secured in position. These steps ensure that the flexible placeholder 1202 (and, hence, the antenna 406) remains in proper position relative to the housing 102 and the through-opening 404 during the manufacture of the flexible member 104. Next, uncured material is forced by an injection molding apparatus into the flexible member mold (not shown), where it surrounds the flexible placeholder 1202, the antenna 406, and selected parts of the housing 102. Thereafter, the material is cured, forming the flexible member 102c, within which the flexible placeholder 1202 and the antenna 406 are enclosed, and to which the housing 102 is attached.

Figure 13:
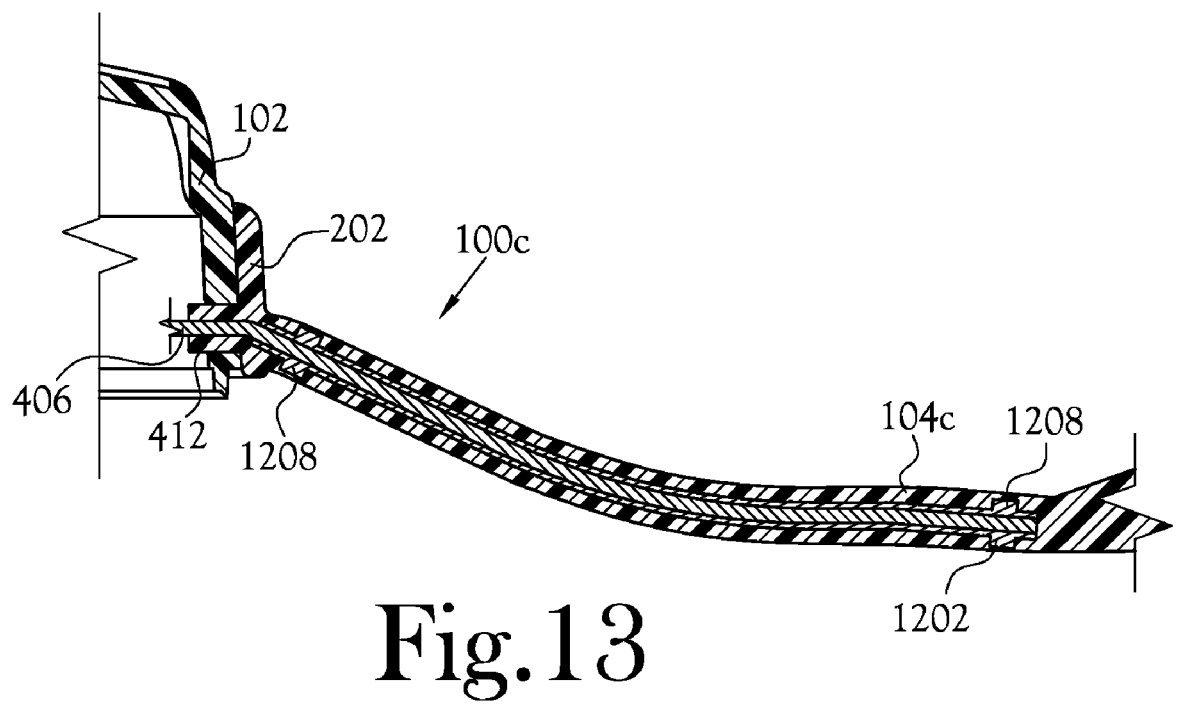
FIG. 13 is an enlarged partial cross-sectional view, taken along lines 13-13 of FIG. 3, of an embodiment of the apparatus of the present invention manufactured using the flexible placeholder depicted in FIG. 12.

FIG. 13 is a partial cross-sectional view, taken along lines 13-13 of FIG. 3, of an embodiment of the improved apparatus 100c that was manufactured using the third method, i.e., the method requiring the flexible placeholder 1202. FIG. 13 discloses the configuration of the housing 102, the flexible member 104c, the flexible placeholder 1202, the through-opening 404, the flexible member flash 412, and the antenna 406.

One skilled in the art will recognize that certain applications may require enclosing an electrical conductor other than an antenna in the flexible member or flexible placeholder. Depending on the nature of the application, that electrical conductor either may replace, or coexist with, the antenna. For example, in still another embodiment of the improved apparatus, only the middle section of an electrical conductor is embedded in the flexible placeholder, leaving both ends available for insertion into housings via through-openings. In this embodiment, the electrical conductor forms a conductive connection between two electronic components, each of which is enclosed in its own housing. This embodiment aids in distributing more evenly the weight and bulk of two or more electronic components around the neck or other part of an animal.

While the present invention has been illustrated by description of several embodiments and while the illustrative embodiments have been described in detail, it is not the intention of the applicant to restrict or in any way limit the scope of the appended claims to such detail. Additional modifications will readily appear to one skilled in the art. For example, one skilled in the art will recognize that, in some instances, it may be preferable, when manufacturing the flexible member or flexible placeholder, to use molding methods other than injection molding, such as extrusion molding, transfer molding, or compression molding. Thus, the invention in its broader aspects is not limited to the specific details, representative apparatus and methods, and illustrative examples shown and described. Accordingly, departures may be made from such details without departing from the spirit or scope of applicant's general inventive concept.

What is claimed is:

1. A method for manufacturing a device worn by an animal, said device for carrying an electronic apparatus, said method comprising the steps of:
    (a) securing a housing in proper position within a flexible member mold, said flexible member mold defining at least one prong pair, said housing defining an interior and a through-opening, said interior being adapted to receive the electronic apparatus;
    (b) securing an electrical conductor in proper position within said flexible member mold by placing said electrical conductor in said at least one prong pair, said at least one prong pair being adapted to grasp said electrical conductor and, during the molding process that forms a flexible member, maintain said electrical conductor in proper position relative to said housing, said through-opening, and said flexible member mold, while directing said electrical conductor such that it extends into said housing via said through-opening;
    (c) filling said flexible member mold with an uncured material; and
    (d) curing said uncured material to form said flexible member, said flexible member being formed around at least a part of said electrical conductor and around said housing so as to at least partially encapsulate said housing such that said flexible member secures said housing and surrounds said through-opening, forming a substantially watertight seal with said housing around said through-opening, said flexible member being adapted to encircle a part of the animal to allow the animal to carry the device, thereby completing manufacture of said device worn by the animal.

2. A method for manufacturing a flexible member having an embedded electrical conductor, said method comprising the steps of:
    (a) securing an electrical conductor in proper position within a rigid placeholder mold defining an interior surface, at least a part of which is complementary to at least one rigid placeholder;
    (b) filling said rigid placeholder mold with a first uncured material;
    (c) curing said first uncured material to form an intermediate assembly including said at least one rigid placeholder molded around at least one section of said electrical conductor;
    (d) transferring said intermediate assembly to a flexible member mold, said flexible member mold being adapted to maintain said intermediate assembly in proper position by receiving said at least one rigid placeholder;
    (e) filling said flexible member mold with a second uncured material;
    (f) curing said second uncured material to form said flexible member having an embedded electrical conductor.

3. The method of claim 2 wherein said first uncured material differs from said second uncured material.

4. A method for manufacturing a device worn by an animal, said device for carrying an electronic apparatus, said method comprising the steps of:
    (a) securing an electrical conductor in proper position within a rigid placeholder mold defining an interior surface, at least a part of which is complementary to at least one rigid placeholder;
    (b) filling said rigid placeholder mold with a first uncured material;
    (c) curing said first uncured material to form an intermediate assembly including said at least one rigid placeholder molded around at least one section of said electrical conductor;
    (d) securing a housing in proper position within a flexible member mold, said housing defining an interior and a through-opening, said interior being adapted to receive the electronic apparatus;
    (e) transferring said intermediate assembly to said flexible member mold, said flexible member mold being adapted to receive said at least one rigid placeholder and, during the molding process that forms a flexible member, maintain said electrical conductor in proper position relative to said housing, said through-opening, and said flexible member mold, while directing said electrical conductor such that it extends into said housing via said through-opening;
    (f) filling said flexible member mold with a second uncured material; and
    (g) curing said second uncured material to form said flexible member, said flexible member being formed around at least a part of said electrical conductor and around said housing so as to at least partially encapsulate said housing such that said flexible member secures said housing and surrounds said through-opening, forming a substantially watertight seal with said housing around said through-opening, said flexible member being adapted to encircle a part of the animal to allow the animal to carry the device, thereby completing manufacture of said device worn by the animal.

5. The method of claim 4 wherein said first uncured material differs from said second uncured material.

6. A method for manufacturing a flexible member having an embedded electrical conductor, said method comprising the steps of:
 (a) securing an electrical conductor in proper position within a flexible placeholder mold defining an interior surface, at least a part of which is complementary to a flexible placeholder;
 (b) filling said flexible placeholder mold with a first uncured material;
 (c) curing said first uncured material to form an intermediate assembly including said electrical conductor and said flexible placeholder, said flexible placeholder being molded around a section of said electrical conductor;
 (d) transferring said intermediate assembly to a flexible member mold adapted to receive said intermediate assembly and, during the molding process that forms a flexible member, maintain said intermediate assembly in proper position;
 (e) filling said flexible member mold with a second uncured material;
 (f) curing said second uncured material to form said flexible member having an embedded electrical conductor.

7. The method of claim 6 wherein said first uncured material differs from said second uncured material.

8. A method for manufacturing a device worn by an animal, said device for carrying an electronic apparatus, said method comprising the steps of:
 (a) securing an electrical conductor in proper position within a flexible placeholder mold defining an interior surface, at least a part of which is complementary to a flexible placeholder;
 (b) filling said flexible placeholder mold with a first uncured material;
 (c) curing said first uncured material to form an intermediate assembly including said electrical conductor and said flexible placeholder, said flexible placeholder being molded around a section of said electrical conductor;
 (d) securing a housing in proper position within a flexible member mold, said housing defining an interior and a through-opening, said interior being adapted to receive the electronic apparatus;
 (e) transferring said intermediate assembly to said flexible member mold, said flexible member mold being adapted to receive said intermediate assembly and, during the molding process that forms a flexible member, maintain said intermediate assembly in proper position relative to said housing, said through-opening, and said flexible member mold, while directing said electrical conductor such that it extends into said housing via said through-opening;
 (f) filling said flexible member mold with a second uncured material; and
 (g) curing said second uncured material to form said flexible member, said flexible member being formed around at least a part of said intermediate assembly and around said housing so as to at least partially encapsulate said housing such that said flexible member secures said housing and surrounds said through-opening, forming a substantially watertight seal with said housing around said through-opening, said flexible member being adapted to encircle a part of the animal to allow the animal to carry said device.

9. The method of claim 8 wherein said first uncured material differs from said second uncured material.

\* \* \* \* \*